(12) United States Patent
Horvat (10) Patent No.: US 11,940,273 B2
(45) Date of Patent: Mar. 26, 2024

(54) METHOD AND SYSTEM FOR DETERMINING A FLOE SIZE DISTRIBUTION

(71) Applicant: UNIVERSITY CORPORATION FOR ATMOSPHERIC RESEARCH, Boulder, CO (US)

(72) Inventor: Christopher Horvat, Providence, RI (US)

(73) Assignee: UNIVERSITY CORPORATION FOR ATMOSPHERIC RESEARCH, Boulder, CO (US)

(*) Notice: Subject to any disclaimer, the term of this patent is extended or adjusted under 35 U.S.C. 154(b) by 371 days.

(21) Appl. No.: 17/429,084

(22) PCT Filed: Jan. 24, 2020

(86) PCT No.: PCT/US2020/014915
§ 371 (c)(1),
(2) Date: Aug. 6, 2021

(87) PCT Pub. No.: WO2020/171911
PCT Pub. Date: Aug. 27, 2020

(65) Prior Publication Data
US 2022/0128357 A1    Apr. 28, 2022

Related U.S. Application Data

(60) Provisional application No. 62/808,658, filed on Feb. 21, 2019.

(51) Int. Cl.
*G01C 13/00* (2006.01)
*G01C 21/20* (2006.01)

(52) U.S. Cl.
CPC ............ *G01C 13/00* (2013.01); *G01C 21/20* (2013.01)

(58) Field of Classification Search
None
See application file for complete search history.

(56) References Cited

U.S. PATENT DOCUMENTS

2014/0269174 A1* 9/2014 Gagliardi ............. G01V 1/3808
367/15

OTHER PUBLICATIONS

D. A. Rothrock et al, "Measuring the sea ice floe size distribution", Journal of Geophysical Research, vol. 89, No. C4, Jul. 20, 1984 (Jul. 20, 1984), pp. 6477-6486, XP055690708, US ISSN: 0148-0227, DOI: 10.1029/JC089iC04p06477.

* cited by examiner

*Primary Examiner* — Roy Y Yi
(74) *Attorney, Agent, or Firm* — The Ollila Law Group LLC (57) ABSTRACT

A method (100) and system (500) for determining a floe size distribution (350), (516) for a plurality of floes within a geographical area (204), comprising determining a chord length distribution (512) for the geographical area (204), the chord length distribution (512) comprising a plurality of measured floe chord lengths, and determining the floe size distribution (350, 516) over the geographical area (204) based on the chord length distribution (512), the floe size distribution (350, 516) comprising a plurality of floe diameters (402).

12 Claims, 7 Drawing Sheets

METHOD AND SYSTEM FOR DETERMINING A FLOE SIZE DISTRIBUTION

GOVERNMENT LICENSE RIGHTS

This invention was made with United States Government support under awards NA16NWS4620043 awarded by the National Oceanic Atmospheric Administration. The Government has certain rights in this invention.

TECHNICAL FIELD

The present Application is directed to a method to determine floe sizes, and more particularly, to a method to determine floe sizes based on remote sensing ground track data.

BACKGROUND

Earth's polar oceans are covered in sea ice: a thin, heterogeneous interface that plays an important role in the coupling between ocean and atmosphere. Sea ice is a collection of many individual pieces, called floes, which may be characterized in terms of a horizontal length scale, their "size". On the large scales relevant to global climate modeling, the statistical variability of floe size is described using the floe size distribution.

The floe size distribution is an important property of the sea ice cover that influences the multiscale temporal and geographic variability of sea ice, akin to the grain size in sedimentology or particle size distribution in atmospheric chemistry. The scale of individual floes plays a role in many sea-ice-related processes, for example: sea ice melt rate, the evolution of the oceanic mixed layer, atmospheric boundary layer exchange, the sea ice response to applied stress, and the propagation of waves into the ice.

The floe size distribution is also an important property that must be known to develop arctic shipping route optimization software. In order to be useful, however, floe size distribution information must be available at a sufficient frequency support a potent real-time model.

Floe statistics are typically derived using two-dimensional visual photos taken from high-altitude aircraft. The two-dimensional photos were limited in geographical area coverage. Moreover, due to the challenges of obtaining the images in the arctic, which include needing clear weather and appropriate lighting, the two-dimensional visual photos are not available frequently enough to support a real-time model. Under prior methods determining a floe size distribution for a particular geographic area of interest was therefore only possible once every few months.

For at least these reasons, the floe size distributions determined using two-dimensional visual images is not suitable for use in modeling a shipping route or, or even for monitoring the seasonal variability of floes.

Prior art floe size distribution analysis has not made use of satellite altimeter data to develop a floe size distribution.

What is needed is a way to determine a floe size distribution more frequently and with less uncertainty.

SUMMARY

A method for determining a floe size distribution for a plurality of floes within a geographical area is provided. The method comprises determining a chord length distribution for the geographical area, the chord length distribution comprising a plurality of measured floe chord lengths, and determining the floe size distribution over the geographical area based on the chord length distribution, the floe size distribution comprising a plurality of floe diameters.

A system for determining a floe size distribution for a plurality of floes within a geographical area is provided. The system comprises a chord length distribution module configured to determine a chord length distribution for the geographical area, the chord length distribution comprising a plurality of measured floe chord lengths, and a floe size distribution module configured to determine the floe size distribution over the geographical area based on the chord length distribution, wherein the floe size distribution comprises a plurality of floe diameters.

Aspects

According to a further aspect, determining the chord length distribution for the geographical area may further comprise receiving a first series of altimeter data corresponding to the geographical area, identifying one or more first adjacent data points from the first series of altimeter data indicating ice to determine a first floe chord length, identifying one or more second adjacent data points from the first series of altimeter data indicating ice to determine a second floe cord length, and including the first floe chord length and the second floe chord length in the chord length distribution for the geographical area.

According to a further aspect, determining the chord length distribution for the geographical area may further comprise receiving a second data series of altimeter data corresponding to the geographical area, identifying one or more third adjacent data points from the second series of altimeter data indicating ice to determine a third floe chord length, and including the third floe chord length in the chord length distribution for the geographical area.

According to a further aspect, determining the floe size distribution based on chord length distribution may further comprise assuming that the plurality of floes have substantially circular cross-sectional shapes.

According to a further aspect, the substantially circular cross-sectional shapes may have a major axis length that is within 15% of a minor axis length of the substantially circular cross-sectional shape.

According to a further aspect, the chord length distribution module may be further configured to receive a first series of altimeter data corresponding to the geographical area, identify one or more first adjacent data points from the first series of altimeter data indicating ice to determine a first floe chord length, identify one or more second adjacent data points from the first series of altimeter data indicating ice to determine a second floe chord length, and include the first floe chord length and the second floe chord length in the chord length distribution.

According to a further aspect, the chord length distribution module may be further configured to receive a second series of altimeter data corresponding to the geographical area, identify one or more third adjacent data points of altimeter data from the second data series of altimeter data indicating ice to determine a third floe chord length, and include the third floe chord length in the chord length distribution.

According to a further aspect, determining the floe size distribution based on chord length distribution may further comprise assuming that the plurality of floes have substantially circular cross-sectional shapes.

According to a further aspect, the substantially circular cross-sectional shapes may have a major axis length that is within 15% of a minor axis length of the substantially circular cross-sectional shape.

BRIEF DESCRIPTION OF THE DRAWINGS

The same reference number represents the same element on all drawings. The drawings are not necessarily to scale.

DETAILED DESCRIPTION

FIGS. 1A-6 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1A:
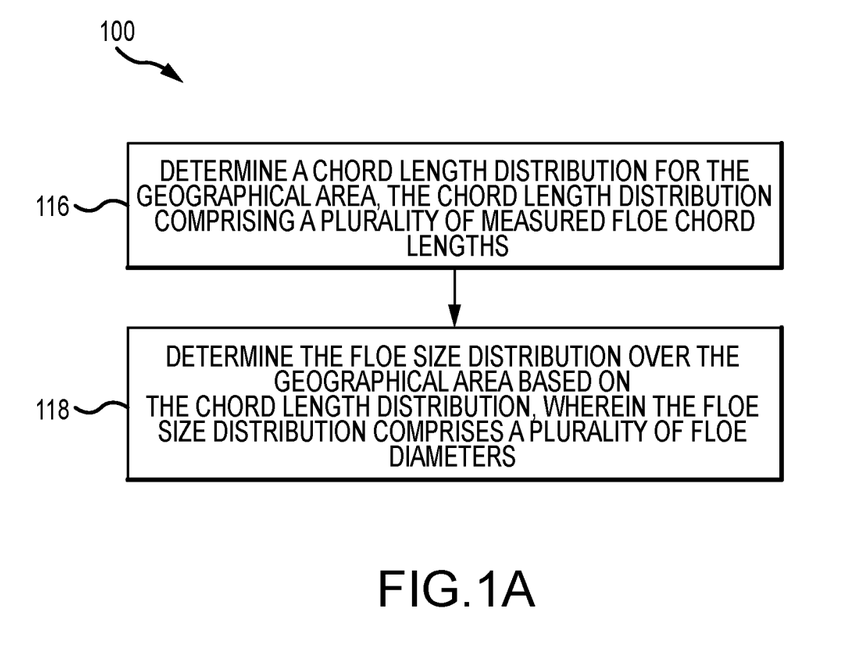
FIG. 1A depicts method 100, in accordance with an embodiment.

FIG. 1A depicts method 100 in accordance with an embodiment. Method 100 may be used to determine a floe size distribution for a plurality of floes within a geographical area. A floe is a sheet of floating ice on the surface of the sea, and plurality of floes is two or more ice floes. The floe size distribution is a distribution of ice floe diameters. The geographical area may be any predefined area.

Figure 2:
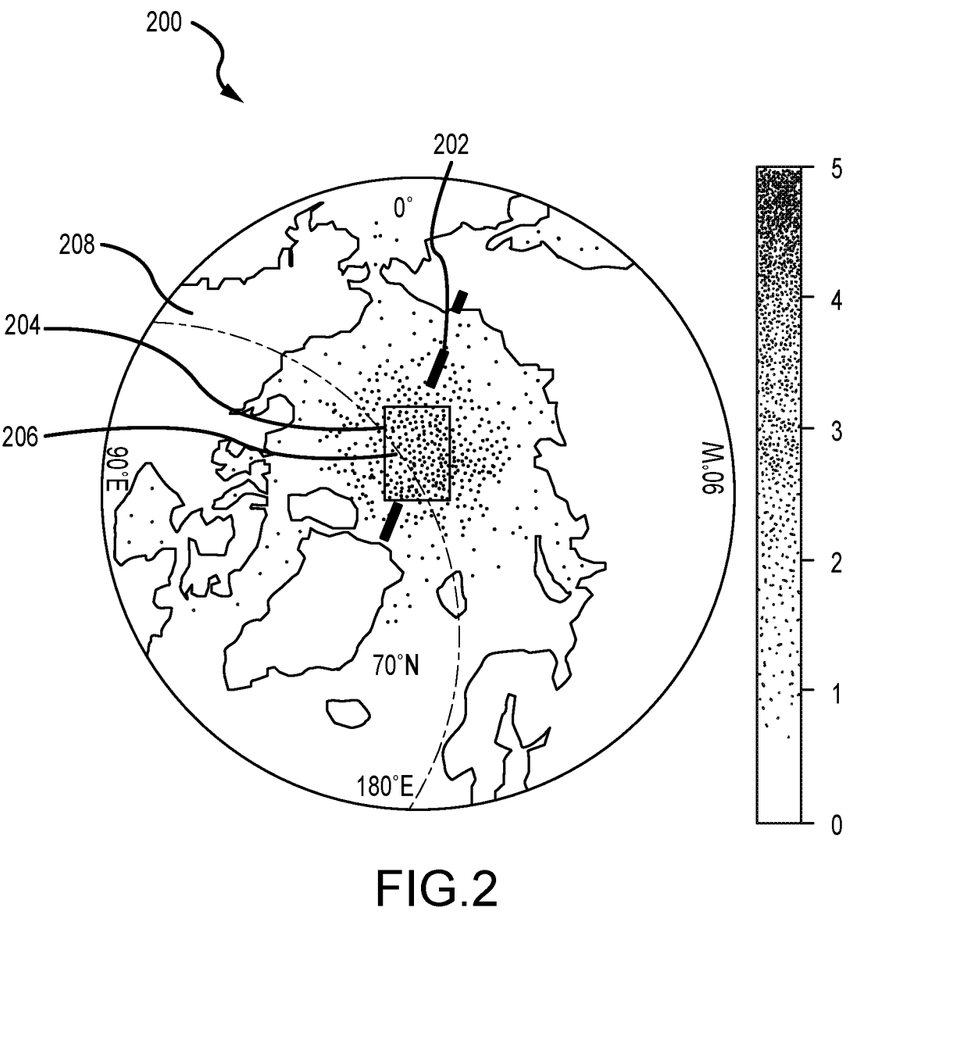
FIG. 2 depicts chart 200, in accordance with an embodiment.

For example, FIG. 2 depicts a chart 200. Chart 200 comprises a map of the arctic in an azimuthal map projection. Chart 200 includes an example geographical area 204. While example geographical area 204 is represented having a simplified rectangle perimeter, this is not intended to be limiting. In embodiments, any regular or irregular perimeter for geographical area 204 may be possible, as will be understood by those of skill in the art.

A floe size distribution may be determined for the geographical area 204 over any convenient sample period. In embodiments, a floe size distribution may be determined over a sample period of a single day, a month, or several months.

Method 100 includes step 116. In step 116, a chord length distribution is determined for the geographical area 204. The chord length distribution comprises a plurality of measured floe chord lengths, or two or more measured floe chord lengths.

In embodiments, individual floes may be measured using remote sensing data taken along a ground track. For example, chart 200 depicts a ground track 202, represented by a dashed line. Ground track 202 may represent an observation pass for a remote sensing instrument moving with respect to the Earth's surface, pointing towards the ground.

In embodiments, the remote sensing instrument may comprise a satellite altimeter. For example, the flight instrument may comprise a polar-orbiting satellite altimeter, returning waveforms along a satellite orbit track that can be used to discriminate between surfaces type, including ice, open water, leads, or ambiguous. Spacecraft altimeters, like the ones carried on the Envisat, ICESat, CryoSat-2, and ICESat-2 satellites, make repeated, frequent passes over polar oceans. For example, CryoSat-2 makes as many as 30 orbits per day, providing surface type data along ground tracks that may be spread out over a polar region. A subset of any plurality of ground tracks 202 observed during a sample period may provide observations that coincide with the geographical area 204 of interest.

In embodiments, data from one or multiple remote sensing instruments may be combined to determine a chord length distribution.

Figure 1B:
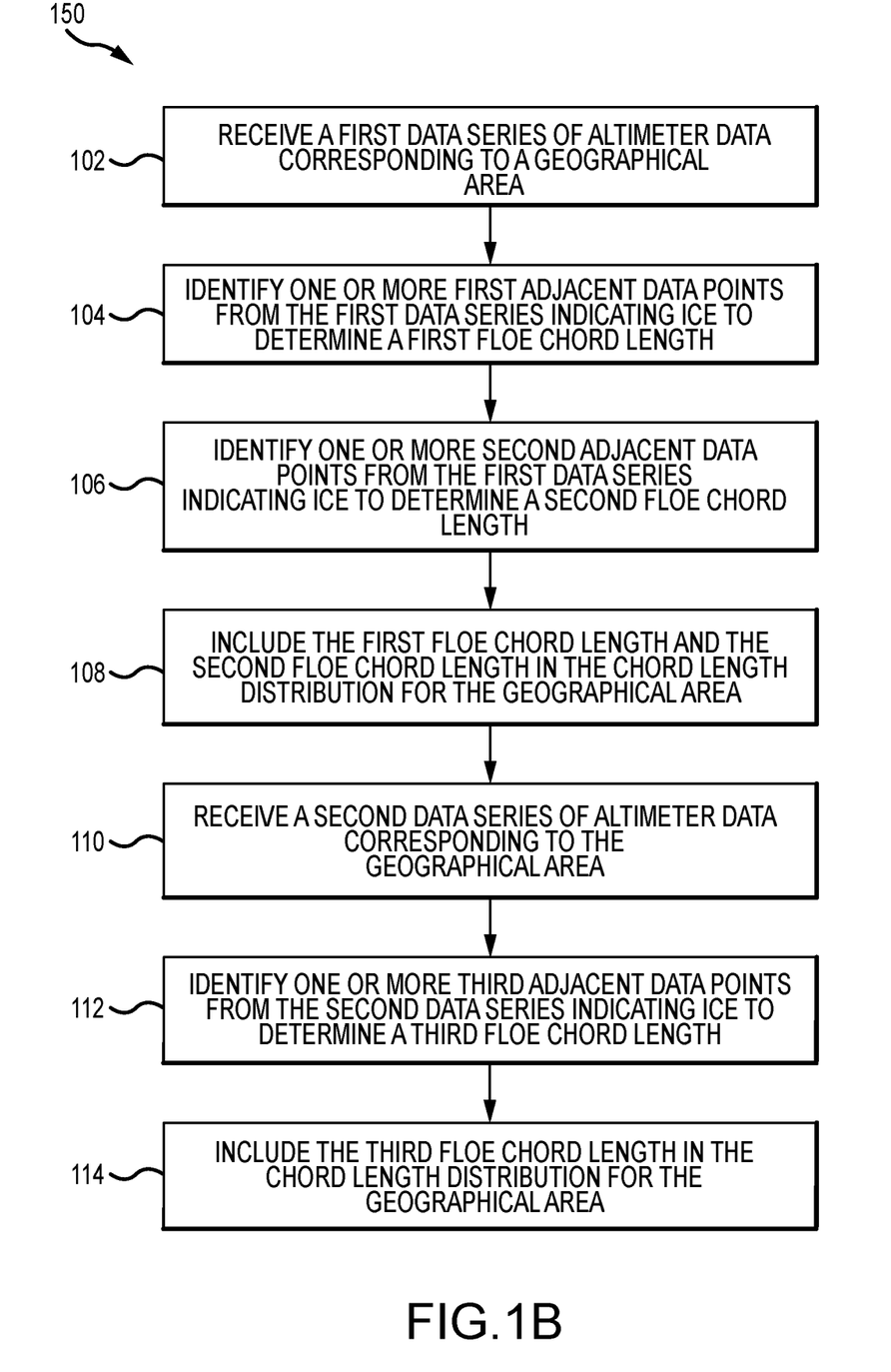
FIG. 1B depicts method 150, in accordance with an embodiment.

In embodiments, step 116 may further comprise any combination of steps from method 150 depicted in FIG. 1B. Method 150 includes steps 102-114. For example, step 116 of method 100 may include steps 102-108 of method 150.

In step 102, a first data series of altimeter data corresponding to geographical area 204 may be received. Each data point of the first data series of altimeter data corresponds to a sequential time and a sequential geographical location along a ground track observation. In examples, the first data series of altimeter data corresponding to geographical area 204 may be a continuous subset of a larger series of altimeter data taken during a longer ground track 202 that includes data outside of the geographical area 204.

The data of the first data series of altimeter data may include an actual waveform of the altimeter radar echo itself, or it may simply correspond to surface types determined from a waveform received along a ground track 202.

The remote sensing device may provide series data that follows an approximately constant along-track spacing over ground track 202. For example, the CryoSat-2 altimeter provides radar echo returns with along-track spacing of 300 m. Because the angle of the remote sensing device with respect to the (also unknown) floe geometry is unknown, only a chord may be directly measured from a ground track 202. Determining floe geometry from the measured chords in the chord length distribution is discussed with respect to step 118 below.

In embodiments, a chord length may be defined as a continuous sequence of one or more first adjacent data points from the first data series, with a gap of at least one non-ice data point preceding and following the one or more first adjacent data points. The chord length may be determined from measuring the geographical midpoint of the first to the geographical midpoint of the last of the one or more first adjacent data points from the first data series.

Figure 3A:
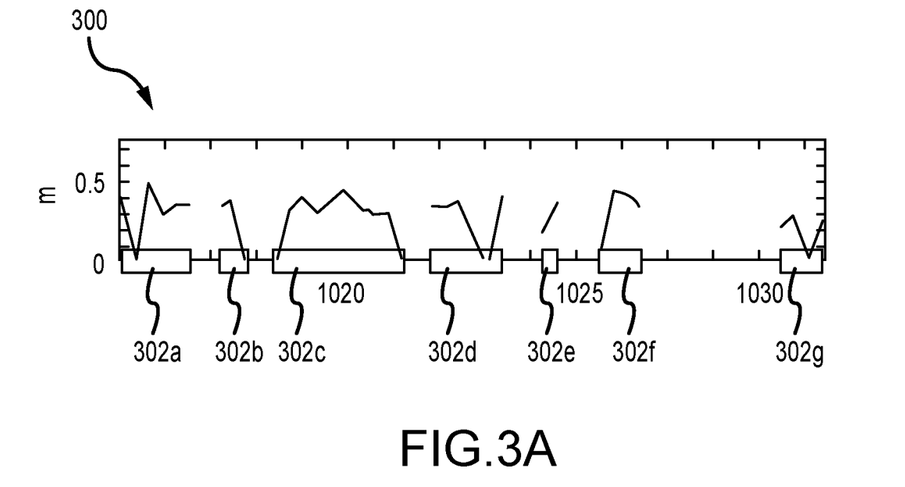
FIG. 3A depicts chart 300, in accordance with an embodiment.

For example, FIG. 3A depicts chart 300. Chart 300 depicts a data series all along ground track 202, and centered along position 206, which may be seen in FIG. 2. The data series depicted in chart 300 corresponds to geographical area 204. The x-axis of chart 300 is distance along ground track 202, and the y-axis is the freeboard, or the distance above the sea waterline of ice measured in radar echoes. Ice floes in chart 300 may be defined as including those sections where the freeboard is above a nominal height.

In embodiments, step 116 may further comprise step 104. In step 104, one or more first adjacent data points from the first data series may be identified as indicating ice to determine a first floe chord length. For example, as may be seen in chart 300, there are seven sections of adjacent data points from the first data series that may be identified as indicating ice: 302a, 302b, 302c, 302d, 302e, 302f, and 302g. The lengths along the x-axis of each of the seven sections of adjacent data points 302a, 302b, 302c, 302d, 302e, 302f, and 302g indicate the respective floe chord lengths, as marked with a thick black line along the x-axis in chart 300.

Figure 3B:
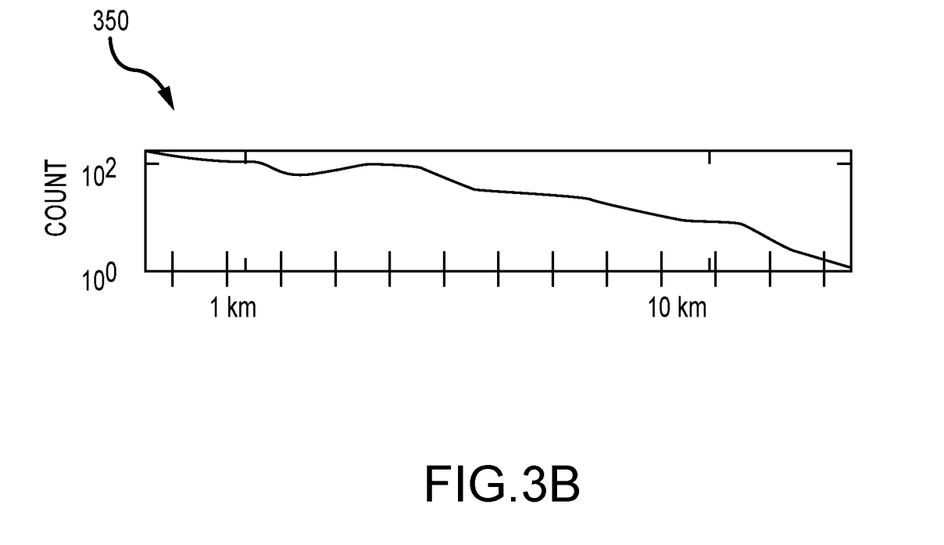
FIG. 3B depicts floe chord distribution 350, in accordance with an embodiment.

FIG. 3B depicts example floe chord distribution 350 for geographic area 204, which was determined using CryoSat-2 data. The x-axis of floe chord distribution 350 represents floe chord lengths on a logarithmic scale, and the y-axis represents counts on a logarithmic scale. In the example floe chord distribution 350 data set, it may be seen that the highest number of counts is for the smallest floe chord size, and the lowest number of counts is for the largest floe size.

In embodiments, single isolated ice data points from the first data series may be eliminated from inclusion in the chord length distribution, to reduce anomalous returns.

In embodiments, step 116 may further comprise step 106. In step 106, one or more second adjacent data points from the first data series may be identified indicating ice to determine a second floe chord length. Step 106 is similar to step 104. For example, first adjacent data points and second adjacent data points could comprise 302a and 302b, as depicted on chart 300.

In embodiments, step 116 may further comprise step 108. In step 108, the first floe chord length and the second floe chord length may be included in the chord length distribution for the geographical area 204. For example, the first and second chord lengths could be included in floe chord distribution 350 for geographical area 204.

In embodiments, step 116 may further comprise steps 110-114. In step 110 a second data series of altimeter data corresponding to the geographical area 204 may be received. Step 110 is similar to step 102, except that it applies to a different data series. For example, as may be seen in FIG. 2, second ground track 208 may correspond to the second data series.

In embodiments, step 116 may further comprise step 112. In step 112, one or more third adjacent data points from the second data series may be identified as indicating ice to determine a third floe chord length. Step 112 is similar to steps 104 and 106, except that it applies to a different data series from a different ground track.

In embodiments, step 116 may further comprise step 114. In step 114, the third floe chord length may be included in the chord length distribution. Steps 110, 112, and 114 may allow for combining data from multiple ground tracks 202, 208 to determine a floe chord distribution for a single geographical area 204.

Because ice floes observed along ground tracks 202, 208 have unknown geometries with unknown alignments with respect to the longitudinal direction along ground tracks 202, 208, ground tracks 202, 208 can only measure floe chords, not floe diameters. This may be understood with the help of FIG. 4, which depicts example circular floe 400. Ground track 202 is depicted as a dotted line crossing floe 400. It may be seen from the figure that because ground track 202 will not necessarily traverse through the center of floe 400, only a chord of floe 400 may be measured.

Figure 4:
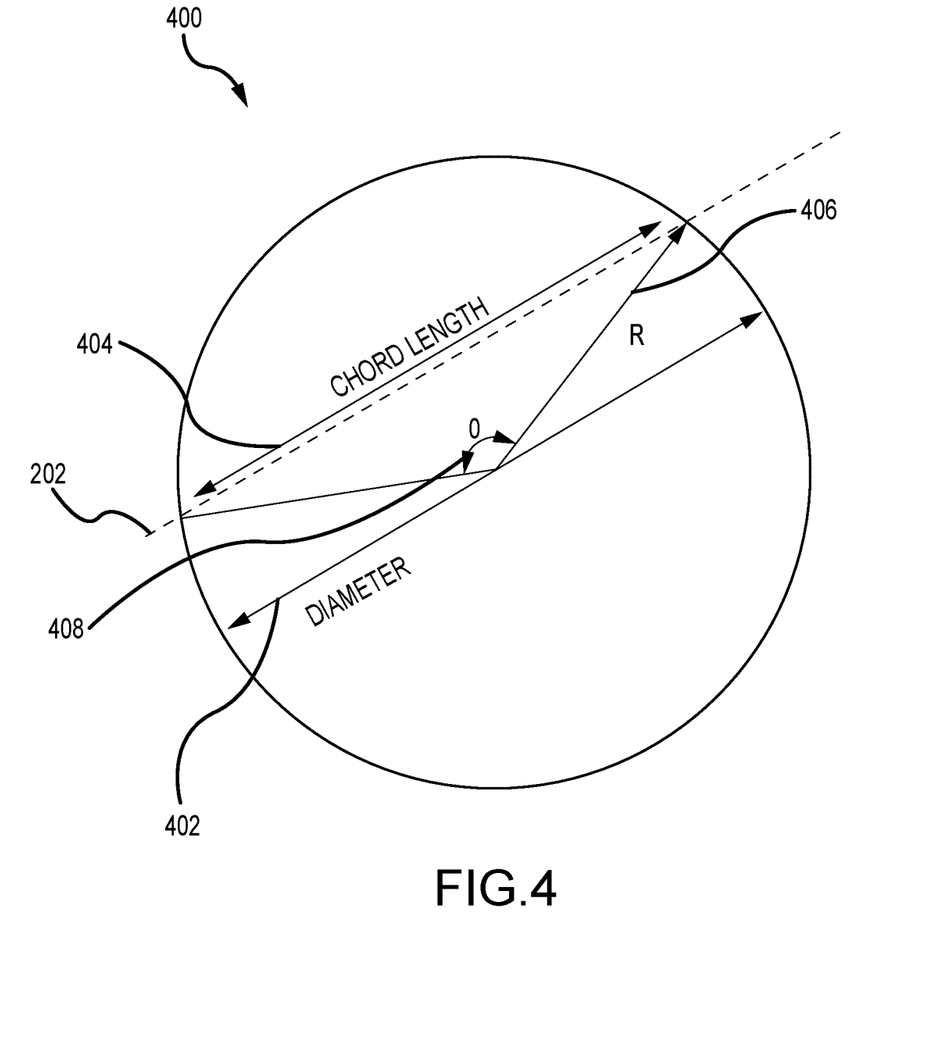
FIG. 4 depicts circular floe 400, in accordance with an embodiment.

Method 100 further includes step 118. In step 118, a floe size distribution is determined based on the chord length distribution, the floe size distribution comprising a plurality of floe diameters over the geographical area 204. For example, FIG. 4 depicts a measured chord length 404 and an estimated diameter 402.

In embodiments, the chord length distribution determined in step 116 may include, for a domain of horizontal geographical area A, and over a sample period of time ΔT, chord lengths measured from several ground tracks 202, 208 by a remote sensing instrument, such as the CryoSat-2 altimeter. The chord length distribution (CLD) comprises a probability distribution S(D), where S(D)dD is equal to the fraction of floe chords in geographical area A over sample period ΔT with length between D and D+dD, and is normalized to one. To collapse all measured chords onto a single independent scalar coordinate (D), it is possible to follow the example of turbulence statistics and assume that the chord length distribution CLD data is homogeneous, isotropic, and stationary within the region and time data is collected. In the same region, we define the floe size distribution (FSD) P(r), where P(r)dr is the fractional number of floes with a size between r and r+dr in A, and is also normalized to one. The CLD inherits the assumptions of homogeneity, isotropy, and stationarity from the FCD. In this way, it is possible to relate the FCD, S(D), or quantities derived from the FCD, to the statistics of the FSD, P(r).

Bayes' theorem relates S(D) and P(r) through conditional probabilities, $$F(r;D)S(D)=\tilde{F}(D;r)P(r). \quad \text{(Equation 1)}$$

The conditional probability F(r;D) relates given chord lengths to the floe size distribution that could generate them: F(r;D)drdD is the probability that floes with size in the range from r to r+dR were sampled given a set of chord lengths in the range from D to D+dD. The conditional probability $\tilde{F}$ (D; r) relates given floe sizes to the chord length distribution they generate: $\tilde{F}$ (D; r) dr dD is the probability of measuring a floe chord of length from D to D+dD given that floes in the size range r to r+dr are being measured.

This second probability distribution $\tilde{F}$ (D; r) can be derived from first principles under a single assumption: that the CLD that would be sampled from a set of floes of size r is independent of r (equivalently, the floe shape distribution is scale-invariant). Formally, this requirement is, $$\tilde{F}(D;r)dD=G(\xi)d\xi, \quad \text{(Equation 2)}$$

where $$G(\xi) = G\left(\frac{D}{r}\right)$$

is an unknown function that integrates to 1 over the interval from ξ=0 to 1. Under this assumption, the distribution of possible chord lengths measured from floes of size r has the same functional form independent of r. The probability distribution F(D;r) may be derived by considering the geometric relationship between straight-line satellite passes and the geometry of the floes they pass over. Individual floe shapes are highly variable: making an assumption about the distribution of floe shapes may introduce biases in the statistics derived from the FCD. Yet, the ability to derive FSD statistics from the FCD does not depend on the precise form of the conditional probability $\tilde{F}$ (D; r) so long as the homogeneous, isotropic, stationary, and scale-invariance assumptions are retained.

In prior assessments of the ratio of major and minor axes of individual floes based on two-dimensional images, the "roundness" parameter for a floe, has typically been found to be within 15% of 1. This suggests that it may be possible to determine a representative floe size distribution from a chord length distribution by assuming that each individual floe has a substantially circular cross section.

Therefore, in embodiments, determining the floe size distribution based on chord length distribution may further comprise assuming that the plurality of floes have substantially circular cross-sectional shapes. The embodiments of the Application therefore solve for the conditional probability $\tilde{F}$ (D; r) by solving the geometric problem that relates measured chord lengths to underlying floe size by assuming that the cross-sectional shape of the floes are substantially circular. For example, FIG. 4 depicts a circular cross-sectional shape for floe 400. In further embodiments, however, the substantially circular cross-sectional shapes may have a major axes that is within 15% or 20% of a minor axes.

The special case that all floes are perfect circles is illustrated in FIG. 4. Because the orientation of floe 400 will not necessarily be correlated with any ground track, an individual measured floe chord length D 404 measured across a floe having radius R 406 is obtained from a ground track 202 that crosses the floe at a random interior angle θ 408. It may therefore be assumed that the distribution of interiors angle θ ∈[0, π) is uniform, T(θ; r)=π$^{-1}$. The diameter D 402 is thus a floe chord length D of a circular floe 400, with D=2r sin(π/r). Accordingly, $\tilde{F}$(D; r) may be represented by Equation 3 below:

$$\tilde{F}(D; r) = T(\theta; r)\frac{\partial \theta}{\partial D} = \begin{cases} \frac{2}{\pi}\frac{1}{\sqrt{(2r)^2 - D^2}} & r < D/2 \\ 0 & \text{otherwise} \end{cases} \quad \text{(Equation 3)}$$

Equation 3 is a probability function that meets the above criterion of Equation 2.

Figure 5:
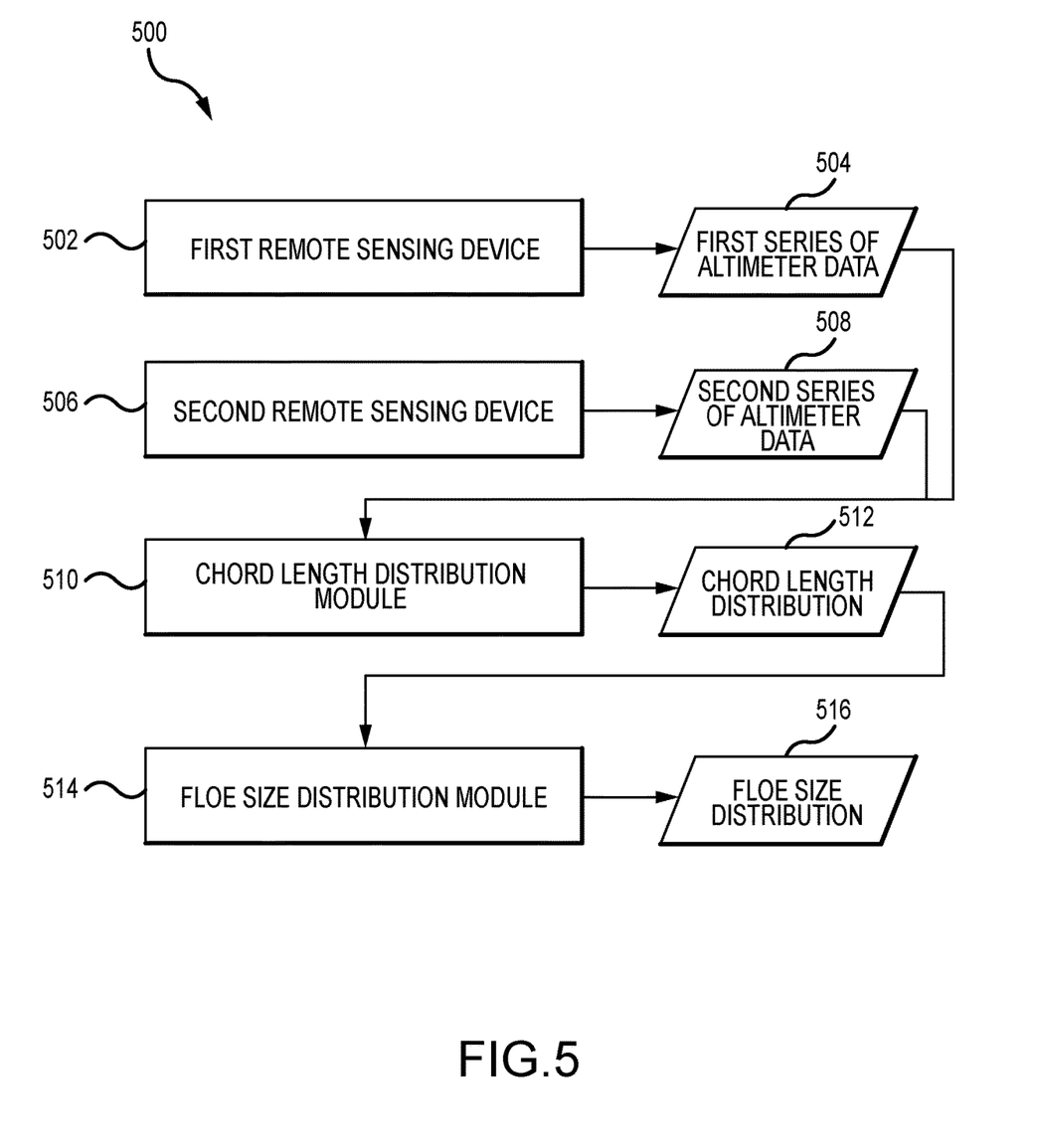
FIG. 5 depicts system 500, in accordance with an embodiment.

In examples, the steps of methods 100 and/or 150 may be executed using system 500 of FIG. 5. System 500 may be used to determine a floe size distribution for a plurality of floes within a geographical area 204.

System 500 includes a chord length distribution module 510 configured to determine a chord length distribution 512 for the geographical area 204, the chord length distribution 512 comprising a plurality of measured floe chord lengths. Chord length distribution module 510 may perform any combination of step 116 of method 100 or steps 102-114 of method 150, as described above.

System 500 further includes a floe size distribution module 514 configured to determine the floe size distribution 516 over the geographical area 204 based on the chord length distribution 512, the floe size distribution 516 comprising a plurality of floe diameters over the sample period. Floe size distribution module 514 may perform step 118 of method 100, as described above.

In examples, system 500 may further comprise any combination of first remote sensing device 502 and second remote sensing device 506. In embodiments, first remote sensing device 502 and second remote sensing device 506 may comprise any combination of spacecraft altimeters, aircraft-mounted altimeters, or any other remote sensing devices capable of providing ground track time series data from which floe chord length distribution 512 data may be extracted known to those of skill. In examples, first remote sensing device 502 may provide first series altimeter data 504, as described in step 102 above, and second remote sensing device 506 may provide second series altimeter data 508, as described in step 110 above.

Figure 6:
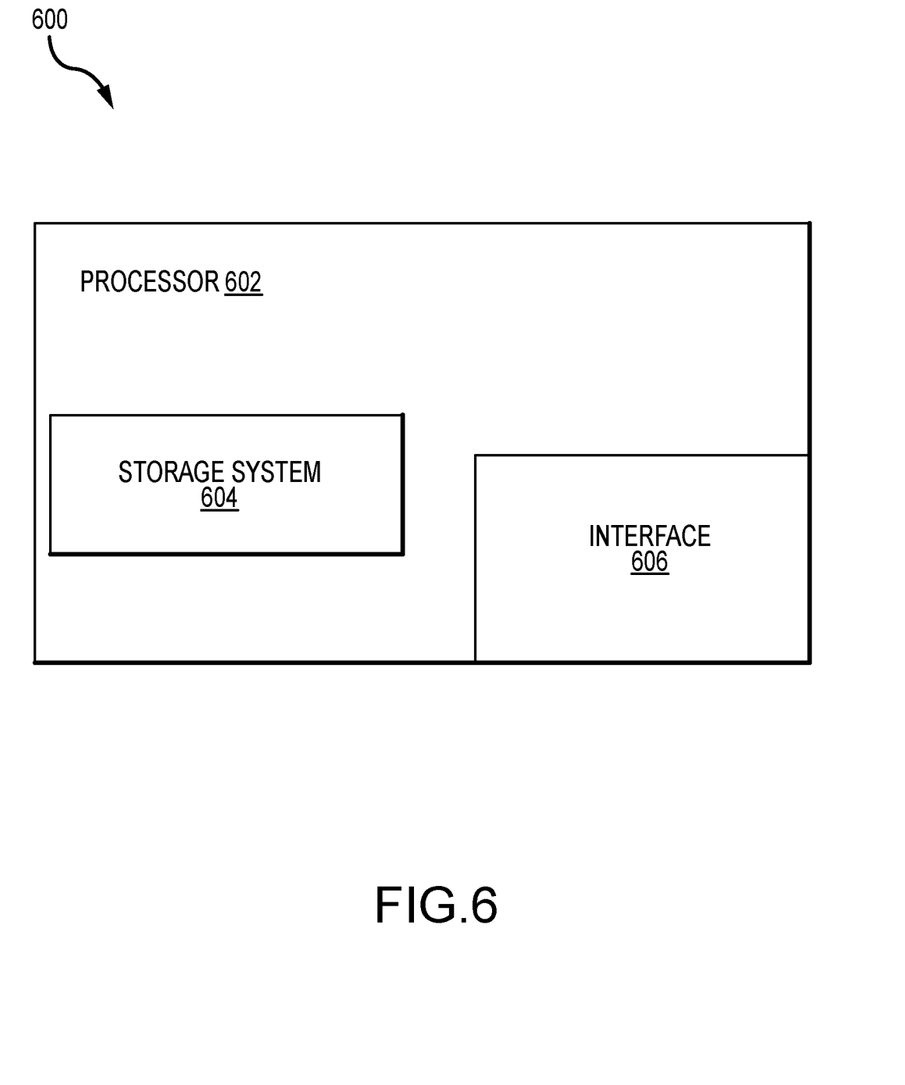
FIG. 6 depicts processing system 600, in accordance with an embodiment.

FIG. 6 depicts processing system 600. Processing system 600 includes processor 602, which may be configured to execute computer instructions to perform a portion or all of the methods described in relation to FIGS. 1 to 4, or may execute a portion or all of the functions relating to one or more modules of system 500. In embodiments, processor 602 may include a single, or any multiple number of processors, as will be understood by those of skill in the art.

Processing system 600 further includes storage system 604. Storage system 604 may be an electronically readable medium or a computer readable medium configured to store computer program instructions. In examples, storage system 604 may include a non-transitory medium. Stored computer program instructions, when executed on the processor 602, may perform a portion or all of the methods described in relation to FIGS. 1A to 4, or may execute a portion or all of the functions of one or more modules of system 500.

In examples, portions of the methods described in relation to FIGS. 1 to 4, or operations relating to the modules in relation to FIG. 5 may be stored or executed outside of system 600. For example, a portion of the methods described in relation to FIGS. 1A to 4 may be stored or executed on a combination of a server and cloud storage facility via the Internet.

Interface 606 may be configured to communicate with devices external to processing system 600.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A method for determining a floe size distribution for a plurality of floes within a geographical area, the method comprising:
   determining a chord length distribution for the geographical area, the chord length distribution comprising a plurality of measured floe chord lengths; and
   determining the floe size distribution over the geographical area based on the chord length distribution, the floe size distribution comprising a plurality of floe diameters;
   wherein determining the chord length distribution for the geographical area further comprises:
      receiving a first series of altimeter data corresponding to the geographical area;
      identifying one or more first adjacent data points from the first series of altimeter data indicating ice to determine a first floe chord length;
      identifying one or more second adjacent data points from the first series of altimeter data indicating ice to determine a second floe chord length; and
      including the first floe chord length and the second floe chord length in the chord length distribution for the geographical area.

2. A method as claimed in claim 1, wherein determining the chord length distribution for the geographical area further comprises:
   receiving a second series of altimeter data corresponding to the geographical area;
   identifying one or more third adjacent data points from the second series of altimeter data indicating ice to determine a third floe chord length; and
   including the third floe chord length in the chord length distribution for the geographical area.

3. A system for determining a floe size distribution for a plurality of floes within a geographical area, the system comprising:
   a chord length distribution module configured to determine a chord length distribution for the geographical area, the chord length distribution comprising a plurality of measured floe chord lengths; and
   a floe size distribution module configured to determine the floe size distribution over the geographical area based on the chord length distribution, wherein the floe size distribution comprises a plurality of floe diameters;
   wherein the chord length distribution module is further configured to receive a first series of altimeter data corresponding to the geographical area, identify one or more first adjacent data points from the first series of altimeter data indicating ice to determine a first floe chord length, identify one or more second adjacent data points from the first series of altimeter data indicating ice to determine a second floe chord length, and include the first floe chord length and the second floe chord length in the chord length distribution.

4. A system as claimed in claim 3, wherein the chord length distribution module is further configured to receive a second series of altimeter data corresponding to the geographical area, identify one or more third adjacent data points of altimeter data from the second series of altimeter data indicating ice to determine a third floe chord length, and include the third floe chord length in the chord length distribution.

5. A system as claimed in claim 3, further comprising:
   a shipping route optimization module configured to use the flow size distribution and a real time model to determine an optimized shipping route through Arctic or Antarctic seas.

6. A system as claimed in claim 5, further comprising:
   a shipping navigation module configured to navigate a ship using the optimized shipping route.

7. A method for determining a floe size distribution for a plurality of floes within a geographical area, the method comprising:
   determining a chord length distribution for the geographical area, the chord length distribution comprising a plurality of measured floe chord lengths;
   determining the floe size distribution over the geographical area based on the chord length distribution, the floe size distribution comprising a plurality of floe diameters;
   wherein determining the floe size distribution based on chord length distribution further comprises assuming that the plurality of floes have substantially circular cross-sectional shapes; and
   wherein the substantially circular cross-sectional shapes have a major axis length that is within 15% of a minor axis length of the substantially circular cross-sectional shape.

8. A method as claimed in claim 7, wherein determining the chord length distribution for the geographical area further comprises:
   receiving a second series of altimeter data corresponding to the geographical area;
   identifying one or more third adjacent data points from the second series of altimeter data indicating ice to determine a third floe chord length; and
   including the third floe chord length in the chord length distribution for the geographical area.

9. A system for determining a floe size distribution for a plurality of floes within a geographical area configured to determine a chord length distribution for the geographical area comprising a plurality of measured floe chord lengths;
   a floe size distribution module configured to determine the floe size distribution over the geographical area based on the chord length distribution comprises a plurality of floe diameters;
   wherein determining the floe size distribution based on chord length distribution further comprises assuming that the plurality of floes have substantially circular cross-sectional shapes; and
   wherein the substantially circular cross-sectional shapes have a major axis length that is within 15% of a minor axis length of the substantially circular cross-sectional shape.

10. A system as claimed in claim 9, wherein the chord length distribution module is further configured to receive a second series of altimeter data corresponding to the geographical area, identify one or more third adjacent data points of altimeter data from the second series of altimeter data indicating ice to determine a third floe chord length, and include the third floe chord length in the chord length distribution.

11. A system as claimed in claim 9, further comprising:
   a shipping route optimization module configured to use the flow size distribution and a real time model to determine an optimized shipping route through Arctic or Antarctic seas.

12. A system as claimed in claim 11, further comprising:
   a shipping navigation module configured to navigate a ship using the optimized shipping route.

* * * * *